US006666305B1

(12) United States Patent
Vohla

(10) Patent No.: US 6,666,305 B1
(45) Date of Patent: Dec. 23, 2003

(54) BRAKE APPLICATION DEVICE FOR A MOTOR VEHICLE BRAKE

(75) Inventor: Manfred Vohla, Munich (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 93 days.

(21) Appl. No.: 10/088,858
(22) PCT Filed: Sep. 15, 2000
(86) PCT No.: PCT/EP00/09016
§ 371 (c)(1), (2), (4) Date: Apr. 16, 2002
(87) PCT Pub. No.: WO01/21973
PCT Pub. Date: Mar. 29, 2001

(30) Foreign Application Priority Data

Sep. 23, 1999 (DE) .......................... 199 45 702

(51) Int. Cl.⁷ ...................... F16D 59/02; F16D 55/224; F16D 65/21
(52) U.S. Cl. ...................... 188/58; 188/72.1; 188/72.3; 188/72.8; 188/158; 188/162; 188/156
(58) Field of Search .................... 188/156, 158, 188/181 T, 162, 161, 216, 72.1, 72.6, 72.7, 72.8, 58–59, 72.3, 170, 171, 173, 106 P; 303/115.2, 3, 20; 318/372, 362, 273, 371; 310/80; 185/40 R

(56) References Cited

U.S. PATENT DOCUMENTS

| 4,175,645 A | * 11/1979 | Brinkert .................. 188/72.1 |
| 4,202,430 A | * 5/1980 | Stevens .................. 188/171 |
| 4,532,462 A | * 7/1985 | Washbourn et al. ........ 318/372 |
| 4,546,297 A | * 10/1985 | Washbourn et al. ........ 318/372 |
| 4,546,298 A | * 10/1985 | Wickham et al. .......... 318/372 |
| 4,589,531 A | * 5/1986 | Washbourn .................. 477/22 |
| 4,784,244 A | * 11/1988 | Carre et al. ............... 188/156 |
| 4,953,668 A | * 9/1990 | Severinsson .............. 188/158 |
| 4,953,669 A | * 9/1990 | Severinsson .............. 188/171 |
| 5,092,432 A | * 3/1992 | Taig ........................ 188/72.3 |
| 5,620,077 A | * 4/1997 | Richard .................. 192/12 D |
| 5,803,211 A | * 9/1998 | Wilke ...................... 188/173 |
| 6,276,497 B1 | * 8/2001 | Severinsson .............. 188/72.7 |
| 6,390,247 B1 | * 5/2002 | Drennen .................. 188/72.8 |
| 6,431,330 B1 | * 8/2002 | Poertzgen et al. .......... 188/156 |

FOREIGN PATENT DOCUMENTS

| DE | 3423510 | * | 1/1986 |
| DE | 4403740 | * | 8/1995 |
| DE | 19514463 | * | 11/1996 |
| DE | 19607759 | * | 5/1997 |
| DE | 019945701 | * | 4/2001 |
| DE | 19945703 | * | 4/2001 |
| EP | 166156 | * | 1/1986 |
| EP | 334434 | * | 9/1989 |
| EP | 693633 | * | 1/1996 |
| GB | 909176 | * | 10/1962 |
| GB | 2190441 | * | 11/1987 |
| WO | WO 01/21977 A1 | * | 3/2001 |
| WO | WO 02/44002 A1 | * | 6/2002 |

* cited by examiner

Primary Examiner—Douglas C. Butler
(74) Attorney, Agent, or Firm—Barnes & Thornburg

(57) ABSTRACT

The invention relates to a brake application device for a motor vehicle brake, in particular to a brake application device for a rail vehicle brake and preferably to a brake application device for a rail vehicle disc brake, comprising a braking force generator for applying and/or releasing the vehicle brake and a braking force converter for converting the energy delivered by the braking force generator into a brake application motion. The brake application device is characterised in that the braking force converter is configured in such a way that the force which is to be exerted by the braking force generator during braking, in order to generate a defined brake application force which is greater than zero and less than the maximum brake force, measures zero.

20 Claims, 5 Drawing Sheets

Fig. 1 — release position

BRAKE APPLICATION DEVICE FOR A MOTOR VEHICLE BRAKE

This application is a 371 of PCT/EP00/09016 filed Sep. 15, 2000.

BACKGROUND AND SUMMARY OF THE INVENTION

The invention relates to an application device for a vehicle brake, particularly for a rail vehicle brake.

An application device of the above-mentioned type is known from Patent Document 195 14 463 C.

This document describes a combination of a pneumatic service brake and a spring-loaded parking brake. The spring-type accumulator is inserted by a complete bleeding of the spring accumulator cylinder.

European Patent Document EP 0 125 873 B1 describes a brake actuator having an electric-motor drive for tensioning a spring-type accumulator. In the case of the spring accumulator service brake, the maximal application force can be adjusted by a displaceable elastic stop.

Furthermore, European Patent Document EP 0 693 633 A2, a permanent-magnet brake shows that the application force is generated by two magnet arrangements. The two magnetic forces can be mutually added or subtracted.

Furthermore, U.S. Patent Document U.S. Pat. No. 5,620,077 describes a spring-type accumulator service brake in the case of which an electric motor is used for tensioning a spring-type accumulator. The electric motor and the spring-type accumulator, as the brake actuator, are connected with one another by an electrically operable coupling device. The brake actuator with the spring-type accumulator operates such that the release position is reached by compressing the spring. However, the spindle operates in only one direction, specifically the direction of the tensioning of the spring. As a result of a design which is such that the brake is spring-actuated and that electric energy is required for releasing the brake or for compressing the spring, a "fail-safe design" of the brake is achieved.

Essentially two wheel brake systems are currently used in the rail vehicle field: Pneumatic brake systems (which may include electropneumatic systems and vacuum brakes) and (electro)hydraulic brake systems. Purely electromechanical brake systems have been unable to establish themselves to any significant extent in the market.

In both technologies, the force is generated by pistons in cylinders which generally have only one operating direction. The restoring of the pistons takes place as a result of the forces occurring because of the elastic deformation of the brake linkage as well as a result of restoring springs which, in addition, ensure the taking-up of an end position. Special constructions having a double cylinder (that is, with a possible pressure buildup at each side of the piston for implementing two operating directions) have not been successful, particularly for cost reasons.

Also because of the preferred use of pistons with only one operating direction, when a brake system is configured, either an active or a passive brake system is implemented. However, these systems require high-powered drives or, in the case of electromechanical systems, correspondingly large engines. In addition, in the case of a passive system, a very large adjusting spring is required.

The local energy storage in the event of supply interruptions in the case of pneumatic systems takes place in compressed-air reservoirs; in the case of hydraulic systems, it takes place in corresponding hydraulic reservoirs; and in the case of electromechanical systems, by booster batteries or a redundant power supply. In addition, passive systems contain the possibility of a one-time application as a result of the energy accumulated in the spring.

In the case of an active brake system, the maximal actuator force must be applied during a braking at a maximal braking force, whereas, in the case of a passive brake system, the full actuator force is used for the release.

A disk brake of the above-mentioned type for motor vehicles is also known from U.S. Patent Document U.S. Pat. No. 4,784,244.

In view of this background, the invention has the object of providing an application device whose braking force generator or brake drive and parts of its braking force converter can have significantly smaller dimensions when compared to the actively operating brake system as well as to the passively operating brake system.

The invention achieves this as follows:

At a defined operating point or for a brake application force value between zero and the maximal braking force, the brake drive or the braking force generator has no effect. At this point, the braking force is generated only by the energy accumulator (for example, the spring). This "zero point" of a pure generating of spring braking force is also not at the maximal braking force as in the case of the purely passive system. On the contrary, for generating the maximal braking force, the braking force (and energy) generator or the brake drive is additionally operative. For generating lower braking forces, the brake drive acts virtually as a "baking force reducer" against the force of the energy accumulator or the spring force.

In contrast to the prior art, the brake drive is therefore used in both load directions, that is, for applying the maximal braking force as well as for releasing the brake. As a result, a converter is designed such that, also when the brake drive is switched off, for example, a medium braking force is applied. Only a type of "supporting drive" is required in order to adjust either the maximal braking force or the braking release position. The brake drive—in the case of an electromechanical system, an electric motor-is utilized for reducing the spring force during the release and, during then braking, after the force equilibrium between the brake application force and the spring force has been reached, further increasing the braking force. The drive therefore operates in the manner of a "two-direction principle". Thus, the system combines important advantages of a passive brake system with advantages of an active brake system. Similar to a passive brake system, the system according to the invention with the zero-point displacement also implements a type of fail safe system. An accumulator spring for the brake application can be implemented to be considerably smaller than in the case of a purely passive brake system. In the case of an electric drive, the spring as well as its tensioning and driving motor can be dimensioned to be up to one half smaller because of the invention. In which case, however, the advantage may be arbitrarily and continuously reduced by increasing load accumulations, the definition of certain residual braking forces in the event of a failing of the brake, the parking brake, and a soft spring characteristic.

Since, in contrast to an active brake system, the brake drive does not have to generate the braking force by itself, the brake drive, as well as the entire transmission line, can have a smaller dimension than in the case of a purely active system.

Another advantage of the invention is that control operations within the range of the medium braking force by means of the invention require only low adjusting energies.

The converter is designed to adjust the force applied by the brake drive in ranges about an operational zero point. The range may be between 25 and 75%, or between 40 and 60% or at 50%. Often, for example, in the event of a failure of electric energy, a braking force of 50% of the maximal braking force will be sufficient as a safe fall-back level. The operational zero point can essentially be freely selected. In this case, the person skilled in the art can orient himself according to the respective safety requirements—specifically vehicle and route parameters—of the application case. Thus, he will, for example, place the zero point for the implementation of sufficient braking reserves when designing a street car braking system for a city with many down grades several percent "higher" than in a city whose street car system is largely free of extensive down grades.

Particularly preferably, an electric motor is used as the brake drive, which can have a highly compact design as a result of the invention. However, as an alternative, it is also conceivable that the brake drive is a hydraulic or pneumatic brake cylinder (operating in two directions) or another unit operating in one or two directions.

In each case, a spring or a spring assembly is a suitable energy accumulator. The spring or the spring assembly is preferably designed such and coordinated with the converter and the brake drive that, by means of it, when the brake drive is not active, a defined, particularly a medium braking force can be generated. In particular, the electric motor and the spring or the spring assembly are mutually coordinated such that

- the spring or the spring assembly alone generates a defined braking force value between the minimal and the maximal braking force (operational zero point),
- the spring and the electric motor, in an addition of forces, generate a braking force greater than the defined braking force at the operational zero point, and
- the spring and the electric motor, in a subtraction of forces, generate a braking force less than the operational zero point. As a result of this embodiment of the invention, the electric motor as well as the spring or the spring assembly can have a smaller design than in the case of a purely active or passive electromechanical braking system in which the spring or the electric motor alone must in each case generate the maximal braking or releasing force.

Additional advantageous embodiments of the invention are described.

In the following, the invention will be described in detail by means of embodiments with reference to the drawing.

DETAILED DESCRIPTION OF THE PREFERRED EMBODIMENTS

Figure 1:
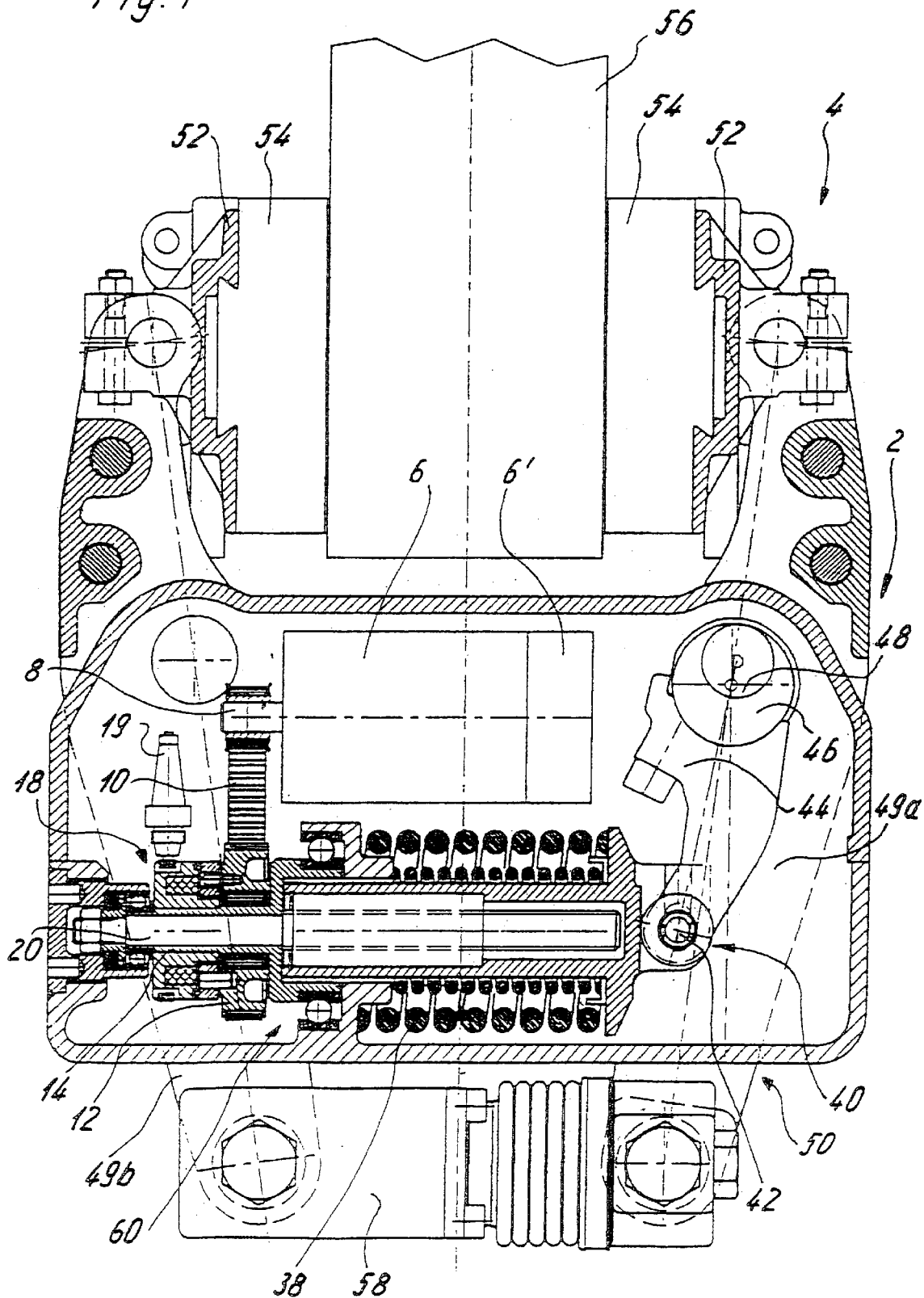
FIG. 1 is a view of a first embodiment of a caliper unit provided with an application device according to the invention, in a brake release position.

FIG. 1 illustrates a brake application device 2 for a rail vehicle disk brake 4. The application device 2 comprises a brake drive constructed as an electric motor 6 (with a joined motor brake 6'). The output shaft 8 of the electric motor 6 (or the output shaft of a transmission assigned to the electric motor 6) drive a pinion 12 by a toothed belt 10. The pinion 12 is rotatably disposed relative to a spindle sleeve 14 on the repeatedly stepped spindle sleeve 14 by a bearing 16, shown as a needle bearing (FIG. 3).

A magnet gear coupling 18 with a current feed 19 is attached to the axial face of the pinion 12. The current feed 19, in turn, is fastened on an axial end section of the spindle sleeve 14. When the electric motor 6 and therefore, by way of the toothed belt 10, the pinion 12 rotates, the spindle sleeve 14 will also rotate when the magnet gear coupling 18 is closed. In contrast, when the magnet gear coupling 18 is open, the gearwheel or pinion 12 will freely rotate on the spindle sleeve 14.

Figure 2:
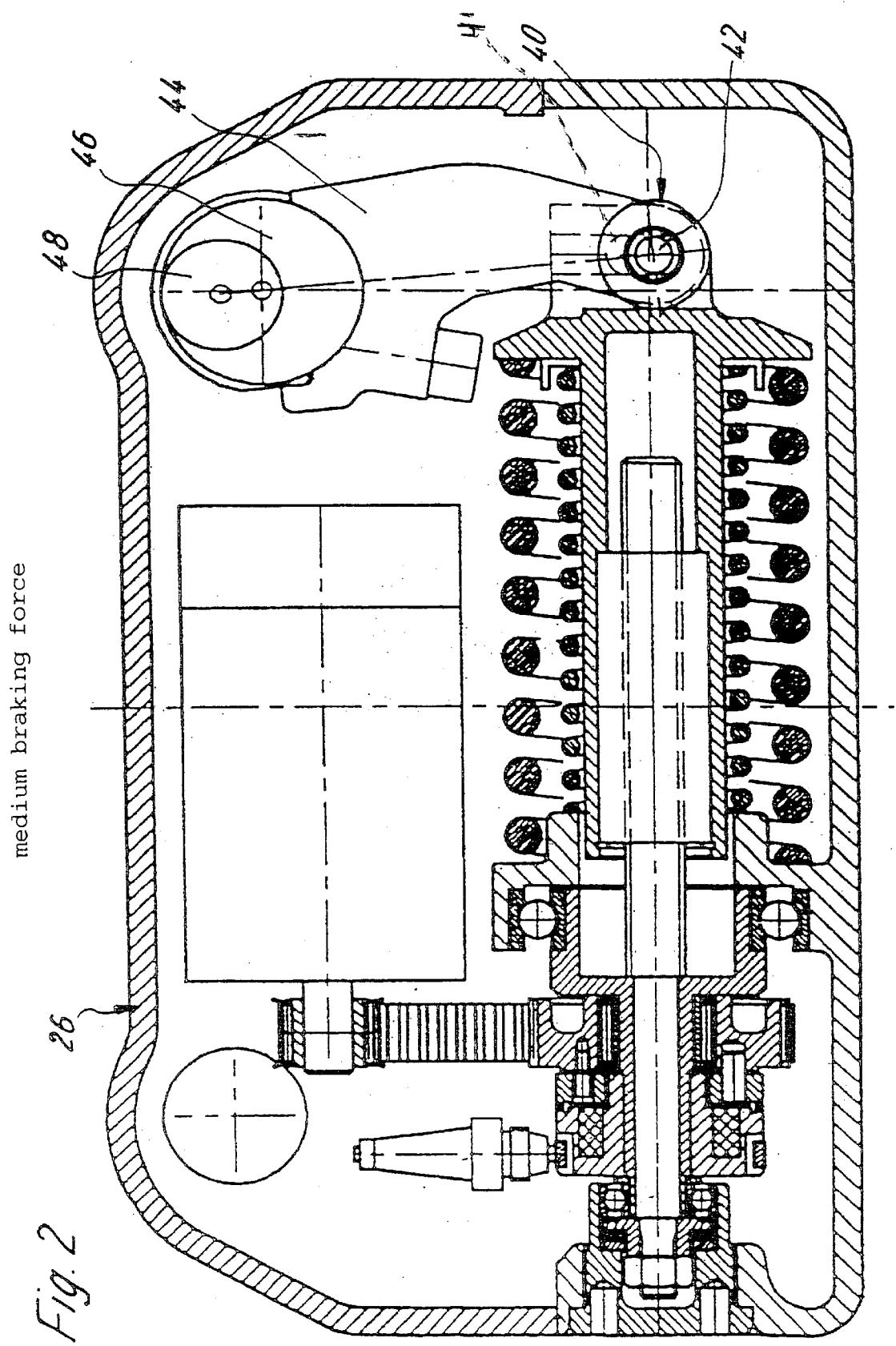
FIG. 2 is a view of the application device of the caliper unit of FIG. 1 when the medium braking force is applied.
Figure 3:
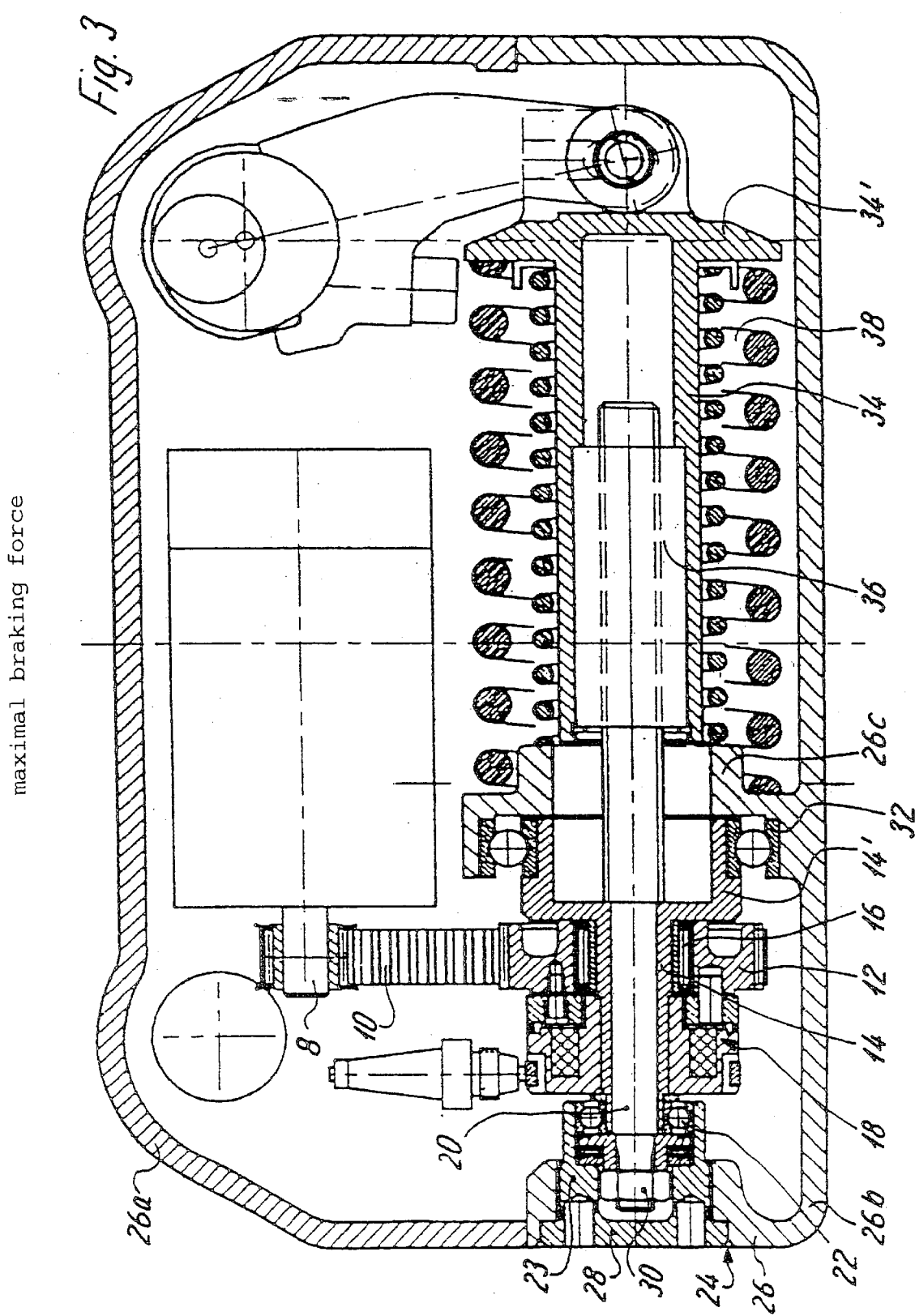
FIG. 3 is a view of the application device of the caliper unit of FIG. 1 when the maximal braking force is applied.

As illustrated particularly well in FIGS. 2 and 3, the spindle sleeve 14 is fastened on a pin or "better" a shaft 20. One axial end of the shaft 20, by a ball bearing 22, is rotatably disposed in a sleeve 23 which is non-rotatably inserted into an opening 24 of a two-part brake frame (or "saddle") 26 (with sections 26a and 26b). A covering 28 is screwed into the opening 24, which covering 28 offers an access possibility for a restoring nut 30 for the manual adjusting of the spindle (for example, for releasing the brake).

The second axial face of the pinion 12, which faces away from the covering 28, adjoins an axially widening graduation 14' of the spindle 14. The outer circumference of the graduation 14' engages a hollow-cylindrical frame attachment 26c of the brake frame 26. The frame attachment 26c is molded toward the inside onto the brake frame 26, and is rotatably disposed in the frame attachment 26c by a roller bearing 32.

The second axial end of the pin or of the shaft 20 extends beyond the axial face of the frame attachment 26c. The interior wall of the hollow-cylindrical end area of the graduation 14' and the interior wall of the interior frame attachment 26c form a hollow-cylindrical receiving device for an end of an axially displaceable exterior sleeve 34. A spindle nut 36 is non-rotatably inserted into the axial opening of the sleeve 34, which spindle nut 36 is rotatably fitted onto the pin 20 which, in this area, is provided with an external thread. (A rolling spindle drive could, for example, be implemented here).

A spring assembly 38 is arranged between the frame attachment 26c and a plate-type attachment 34' of the sleeve 34. An eye 40 having an oblong hole 41 is molded to the face of the sleeve attachment 34' facing away from the spring assembly 38. A pin 42, which is connected with an end of an eccentric lever 44 of an eccentric arrangement 46, engages in this oblong hole 41. The eccentric has an eccentric shaft 48 which is linked to a forked lever 49a which, together with a second forked lever 49b, forms a caliper 50, as shown in FIG. 1. Lining holders 52 having brake linings 54 are in each case arranged at one end respectively of the forked levers 49, which brake linings 54 are displaceable in the direction of the axis of a brake disk 56. The ends of the forked levers 49 facing away from the brake linings 54 are mutually connected by a plunger rod adjuster 58 which is preferably designed in an electrically operated manner and comprises a force sensor and an emergency release device (not shown).

The operation of the brake is indicated by the coordination of FIGS. 1 to 3. FIG. 1 shows the release position; FIG. 2 shows a braking position at a medium braking force; and FIG. 3 shows a braking position at a maximal braking force. The medium braking position is reached only means of the spring force.

The electric motor 6 forms the brake force generator or brake drive; the additional elements of the force transmission path "behind" or from the electric motor 6 to the brake disk 56, form a converter 60. The spring assembly 38 forms an energy accumulator which is also utilized for generating braking force.

As illustrated, the spring assembly 38 will relax as the braking force increases. In this case, the spring assembly is designed such that, when a medium braking force is applied, no energizing of the motor 6 is required. In contrast, for reaching the release position and for reaching the maximal braking force, the electric motor 6 in each case runs in the opposite rotating direction and thereby adjusts the axial length of the linear drive consisting of the spindle sleeve 14, the pin 20 and the sleeve 34. A length change of the linear drive, in turn, adjusts the eccentric 46 and thereby opens or closes the caliper 50.

Figure 4:
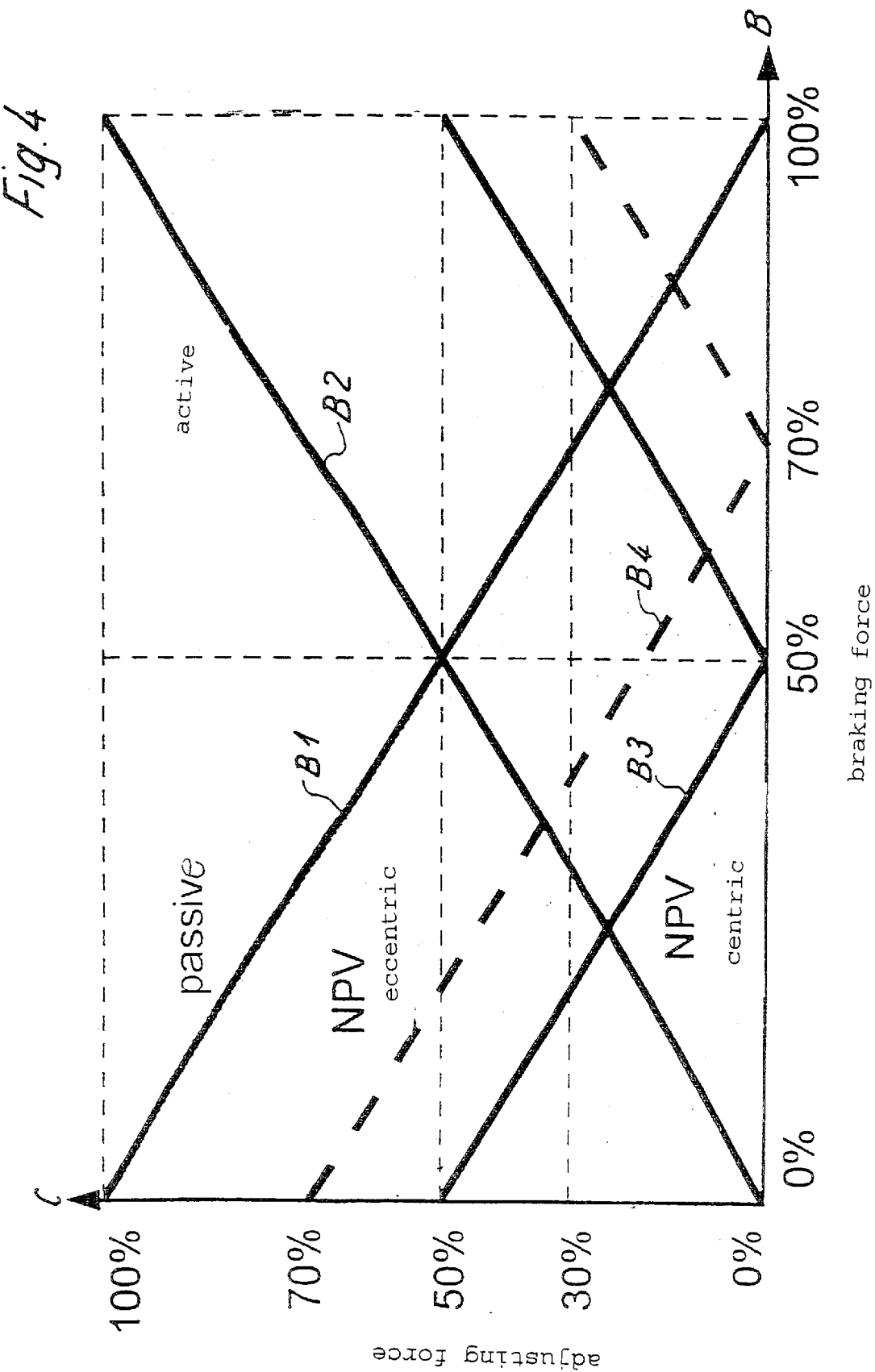
FIG. 4 is a braking force diagram.

In FIG. 4, the C-axis indicates the force to be applied by the actuator; and the B-axis indicates the force applied at the brake shoes. Curve B1 indicates the characteristic of a passive brake system; curve B2 indicates the characteristic of an active brake system; and curve B3 indicates the preferred adjustment of the brake system of the invention (centric zero point). In contrast, curve B4 indicates an eccentric zero point displacement. The eccentric zero point is at approximately 70% of the maximal braking force, so that the system is more similar to the design of a passive brake system (stronger spring or stronger braking force in the event of a failure of the braking force generator). The passive braking system, in which, at the maximal braking force, the drive generates a force of zero newtons, is used, for example, in the standard gauge railway field, and the active braking system, in which, at the maximal braking force, the drive generates the highest force, is used in the subway field. In contrast, according to the invention, the medium force is applied by the accumulator spring 38 alone.

In a practical embodiment of the type of FIG. 1, the eccentric shaft drive may have a ratio of, for example, $1/10$–$1/15$. In the case of this practical embodiment, the total actuator force amounts approximately to several kN, which, at the brake disk, results in a maximal braking force of a multiple of the force. The displaced zero point is approximately at the equilibrium between the spring force and the braking force.

Figure 5:
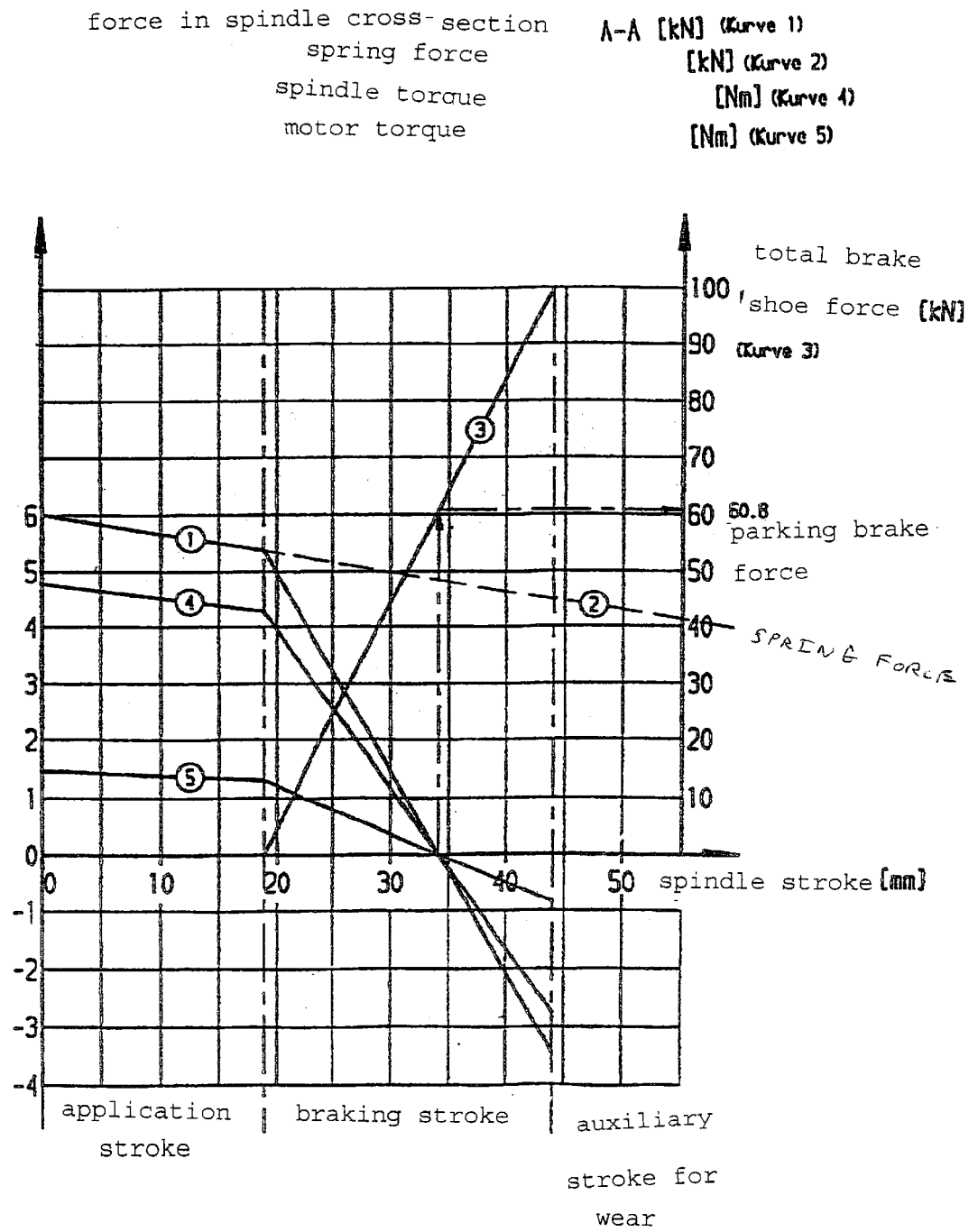
FIG. 5 is a diagram illustrating the forces occurring at significant brake elements as a function of the application stroke in the case of a brake of the type of FIG. 1.

FIG. 5 finally shows the force in the spindle cross-section (curve 1; see Line A—A in FIG. 3). Several kN are applied in the application stroke; the force drops in the braking stroke and, in the case of a spindle stroke of several centimeters, reaches the value 0 N in order to change into the negative range at an increasing spindle stroke. The spring force (curve 2), the total brake shoe force which increases largely linearly during the braking stroke (curve 3), the spindle torque (curve 4), and the motor torque (curve 5) are also illustrated.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed is:

1. An application device for a rail vehicle disk brake comprising:
   a) a brake drive for the application and/or release of the vehicle brake,
   b) an energy accumulator for accumulating and supplying energy for the application and/or release of the brake,
   c) a converter for the conversion of the energy supplied by the brake drive and/or by the energy accumulator into a brake application motion, and
   d) the converter is designed such that, at a defined operating point for a brake application force value between zero and the maximal braking force, the braking force is generated only by the energy accumulator.

2. An application device according to claim 1, wherein the converter is designed such that the force to be applied by the brake drive during a braking for generating a defined brake application force, which is in the range of between approximately 25% and 75% of the maximal braking force, amounts to zero newtons.

3. An application device according to claim 2, wherein the converter is designed such that the force to be applied by the brake drive during a braking for generating a defined brake application force, which is in the range of between 40% and 60% of the maximal braking force, amounts to zero newtons.

4. An application device according to claim 3, wherein the converter is designed such that the force to be applied by the brake drive during a braking for generating a defined brake application force, which is at 50% of the maximal braking force, amounts to zero newtons.

5. An application device according to claim 1, wherein the brake drive is an electric motor.

6. An application device according to claim 1, wherein the brake drive is a brake cylinder acting in two operating directions.

7. An application device according to claim 6, wherein the brake cylinder is designed to be hydraulically or pneumatically operating.

8. An application device according to claim 1, wherein the energy accumulator has a spring or a spring assembly for the application of the brake.

9. An application device according to claim 8, wherein the spring or the spring assembly are designed such that, in case the brake drive is not being active, a defined braking force can be generated.

10. An application device according to claim 1, wherein the brake drive includes an electric motor and the energy accumulator includes a spring or spring assembly; and
    the electric motor and the spring or the spring assembly are mutually coordinated such that
        the spring or the spring assembly alone generates a defined braking force value between the minimal and the maximal braking force as an operational zero point,
        the spring and the electric motor, in an addition of force, generate a braking force greater than the defined braking force at the operational zero point, and
        the spring and the electric motor, in a subtraction of force, generate a braking force less than the operational zero point.

11. An application device according to claim 1, wherein the brake drive acts upon a linear drive for the application and the release of an application element.

12. An application device according to claim 11, wherein the application element is a rail vehicle caliper for the application of brake linings for a brake disk.

13. An application device according to claim 5, wherein the electric motor drives a pinion by a toothed belt, which pinion is rotatably disposed on a spindle sleeve.

14. An application device according to claim 13, wherein the spindle sleeve is fastened on a pin which is rotatably disposed in a brake frame.

15. An application device according to claim 14, wherein the rotating spindle is rotatably disposed on the brake frame.

16. An application device according to claim 14, wherein the pin projects axially beyond an end of the spindle sleeve and, in this area, is provided with a thread onto which a sleeve nut is screwed.

17. An application device according to claim 16, wherein the sleeve nut is inserted into a sleeve, the sleeve being arranged such that it is axially displaced together with the sleeve nut during the rotation of the pin relative to the pin.

18. An application device according to claim 17, wherein an eccentric lever of an eccentric arrangement is on an axial end of the sleeve, which eccentric arrangement is coupled with a caliper.

19. An application arrangement according to claim 13, including a coupling connected between the electric motor and the spindle sleeve.

20. An application device according to claim 19, wherein the coupling is a magnet gear coupling.

* * * * *